UNITED STATES PATENT OFFICE.

JAN LAGUTT, OF BASLE, SWITZERLAND, ASSIGNOR TO CHEMICAL WORKS, FORMERLY SANDOZ, OF SAME PLACE.

PROCESS OF MAKING SACCHARIN.

SPECIFICATION forming part of Letters Patent No. 651,045, dated June 5, 1900.

Application filed February 20, 1900. Serial No. 5,878. (No specimens.)

*To all whom it may concern:*

Be it known that I, JAN LAGUTT, doctor of philosophy, residing at Fabrikstrasse 116, Basle, Switzerland, have invented new and useful Improvements in the Manufacture of Saccharin, (for which Letters Patent have been applied for in England, No. 19,629, dated September 29, 1899, and in Germany, C. 8,704 IV/12$^C$, dated December 23, 1899,) of which the following is a specification.

By oxidizing orthotoluolsulfamid with permanganate in an alkaline solution, according to Fahlberg & List, *Berichte der Deutschen Chemischen Gesellschaft*, 21, 242, saccharin is produced as well as varying quantities of orthosulfamidobenzoic acid. The yield of this by-product can be increased to a high degree by raising the percentage of alkali (soda-lye) in the oxidizing solution. By this means slightly more than the theoretical quantities of permanganate are sufficient for the complete oxidation of the orthotoluolsulfamid. By an appropriate choice of the degree of the dilution (the proportions of the alkali and the temperature) the oxidation process may be carried with nearly-quantitative yield to the formation of a mixture of saccharin and orthosulfamidobenzoic acid, their decomposition into valueless by-products, as orthosulfobenzoic acid and oxalic acid, being almost entirely avoided. Hitherto, however, no economical process was known to convert the orthosulfamidobenzoic acid thus formed into saccharin. It is true that in *Beilstein's Handbuch der Organischen Chemie*, II edition, II volume, page 1295, orthosulfamidobenzoic acid is said to be transformed completely into saccharin by heating at 180° centigrade. After my researches, however, this transformation takes place only to at the best fifty per cent., the other part being converted into the ammonia salt of the orthosulfobenzoic acid, according to the equation.

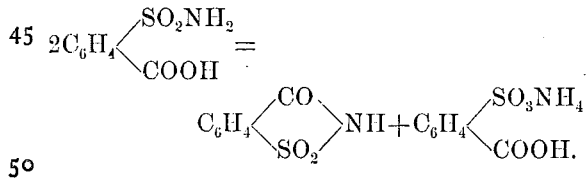

By heating the salts of the orthosulfamidobenzoic acid at about 200° centigrade, according to a note of Fahlberg & Brage, *Berichte der Deutschen Chemischen Gesellschaft*, 22, 754, the yield of saccharin will be much below fifty per cent.

Now a very economical process for the aforesaid transformation has been discovered, according to which approximately the theoretical yields are obtained by treating the dry orthosulfamidobenzoic acid with dehydratizing agents, such as chlorsulfonic acid or more economically-strong sulfuric acid or fuming sulfuric acid. By the use of this process—i.e., by conducting the oxidation of the orthotoluenesulfamid first to the orthosulfamidobenzoic acid and afterward converting this into saccharin—the latter can be obtained in greater yields and cheaper than by the method hitherto known. The orthosulfamidobenzoic acid being of greater acidity than its anhydrid (the saccharin) and the latter being of greater acidity than the parasulfamidobenzoic acid, (the parasaccharin,) pure orthosulfamidobenzoic acid can be very readily obtained from unpurified toluenesulfamid by oxidizing, for instance, a mixture of about seventy to seventy-five per cent. of orthotoluenesulfamid and twenty-five to thirty per cent. of paratoluenesulfamid in an alkaline solution (dilute soda-lye) with permanganate and boiling the concentrated solution of saccharin, ortho- and para-sulfamidobenzoic acid thus obtained with soda-lye until the whole saccharin is saponified to orthosulfamidobenzoic acid. The parasaccharin can be precipitated quantitatively from the resulting solution by adding at a temperature not exceeding 35° centigrade while well stirring dilute mineral acid—as, for instance, muriatic acid of ten per cent.—until a weak acid reaction on Congo paper takes place. Under these conditions not a trace of orthosulfamidobenzoic acid is precipitated. The pure parasaccharin may be filtered out, and from the resulting solution pure orthosulfamidobenzoic acid absolutely free from parasaccharin may be precipitated by a further addition of mineral acids. It is then filtered off, washed, dried, and is now ready for direct transformation into pure saccharin 550, melting at 225° to 227° centigrade.

The improved process may be carried into practice as follows: Forty kilos of orthosulfamidobenzoic acid are introduced slowly by well stirring into one hundred and twenty kilos of fuming sulfuric acid of twenty per cent., care being taken that the temperature does not exceed 40° centigrade. The clear slightly-yellowish solution thus obtained is now allowed to stand at the ordinary temperature for about twenty-four hours. It is then poured upon a mixture of three hundred kilos of ice and one hundred kilos of water. The precipitate of saccharin is filtered, washed with cold water, and dried. The actual yield thus obtained is ninety-five per cent. of the theoretical one.

The quantitative result of the transformation is nearly the same when in the foregoing example the fuming sulfuric acid is substituted by chlorsulfonic acid, sulfuric acid monohydrate, or strong sulfuric acid of 66° Baumé, and therefore these substitutes may be considered as equivalents.

The process may be carried out by substituting a salt of orthosulfamidobenzoic acid as the equivalent of the dry orthosulfamidobenzoic acid.

Now what I claim, and desire to secure by Letters Patent, is the following:

1. The process herein described for the manufacture of saccharin which consists in first dissolving orthosulfamidobenzoic acid in a dehydratizing agent, next, after allowing the solution thus obtained to stand for a time at ordinary temperature, pouring it upon a mixture of ice and water thereby causing the precipitation of saccharin, and afterward filtering off, washing and drying the precipitate.

2. In a process for obtaining saccharin from orthosulfamidobenzoic acid, dissolving the orthosulfamidobenzoic acid in sulfuric acid, substantially as herein described.

In testimony whereof I have signed my name to this specification in the presence of two subscribing witnesses.

JAN LAGUTT.

Witnesses:
 GEORGE GIFFORD,
 MELCHIOR BÖNIGER.